Patented June 16, 1931

1,810,273

UNITED STATES PATENT OFFICE

JOSEF HALLER, OF WIESDORF-ON-THE-RHINE, GERMANY, ASSIGNOR TO GENERAL ANILINE WORKS, INC., OF NEW YORK, N. Y., A CORPORATION OF DELAWARE

NEW AZO DYESTUFFS

No Drawing. Application filed April 2, 1928, Serial No. 266,875, and in Germany April 16, 1927.

The present invention relates to new azodyestuffs.

I have found that new azodyestuffs of the probable general formula:

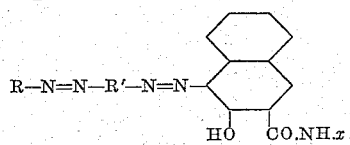

wherein R represents an aromatic nucleus which is substituted by a hydroxy group in the o-position to the —N=N—group and which may be otherwise substituted by substituents not causing solubility in water, such as sulfo- and carboxylic acid groups, and R' and x mean aromatic nuclei which may be substituted by substituents not causing solubility in water, are obtainable by reacting with a suitable arylamid of 2.3-hydroxynaphthoic acid upon a suitable diazotized aminoazo-compound obtained by coupling an o-hydroxy-diazo compound with an aromatic amine which is capable of further diazotization.

Obviously these dyestuffs may be produced either in substance or on the fiber.

The products thus obtainable form dark powders, insoluble in water, sparingly soluble in the usual organic solvents, soluble in strong sulfuric acid with violet-blue to blue colorations, dyeing the fiber strong violet-black to greenish-black shades, the fastness properties of which are improved by after-treatment with suitable metal salts such as copper- or chromium salts.

The following examples illustrate my invention, without limiting it thereto:

*Example 1.*—2.7 parts by weight of the dyestuff obtainable by coupling diazotized o-aminophenol with amino-hydroquinonedi-methylether are dissolved in 200 parts by volume of water and 3 parts by weight of concentrated hydrochloric acid and diazotized by gradual addition of 0.7 parts by weight of sodium nitrite. Now the reaction mixture is brought to 1000 parts by volume by the addition of water and neutralized by means of sodium carbonate. Cotton preliminary treated with an alkaline solution of 2.3-hydroxynaphthoic-acid-α-naphthyl amid is immersed into this diazo solution whereby the addition of sodium carbonate may be of advantage.

The cotton is by this process dyed a deep black shade of good fastness properties, which properties are improved by after-treatment with suitable metal salts.

The dyestuff thus produced on the fiber has in its free form the probable formula:

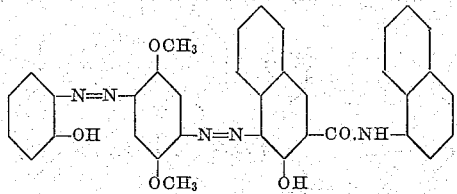

Its solution in strong sulfuric acid is blue.

*Example 2.*—3.2 parts by weight of the dyestuff obtainable by coupling 2-hydroxy-4-nitro-1-diazo-benzene with amino-hydroquinone-dimethylether are diazotized and further treated as described in Example 1. Cotton preliminarily treated with an alkaline solution of 2.3-hydroxynaphthoic acid-β-naphthylamid, is immersed into this diazo solution until the strength of the dyeing no longer increases. Now the cotton is rinsed, soaped and after-treated with copper or chromium-salts. The blue-black dyeings thus obtainable are especially fast to light. The dyestuff, thus produced on the fiber has in its free form the probable formula:

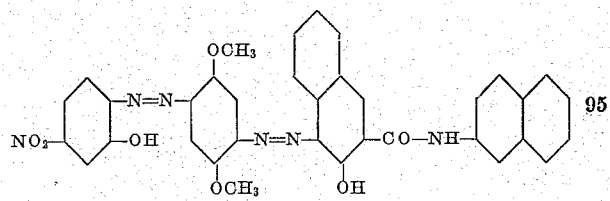

Its solution in strong sulfuric acid is violet-blue.

I claim:
1. New dyestuffs of the probable general formula:

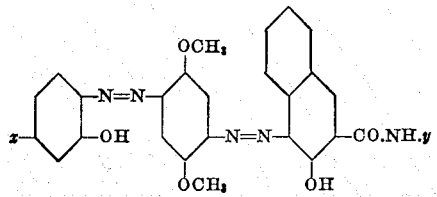

wherein $x$ stands for hydrogen or the nitro-group and $y$ for a naphthalene nucleus, said dyestuffs being dark powders, insoluble in water, sparingly soluble in the usual organic solvents, soluble in strong sulfuric acid with violet-blue to blue colorations, dyeing cotton blue-black to black shades.

2. The dyestuff of the probable formula:

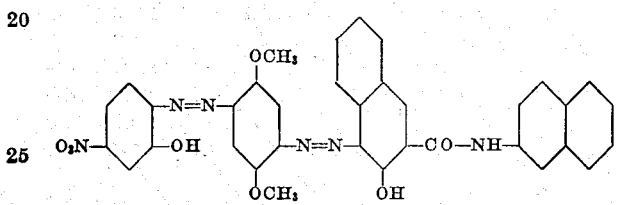

being a dark powder, difficultly soluble in the usual organic solvents, soluble in strong sulfuric acid with a violet blue coloration and dyeing cotton blue-black shades.

3. The dyestuff of the probable formula:

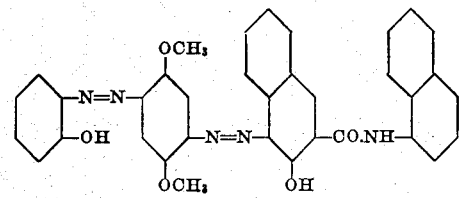

being a dark powder, difficultly soluble in the usual organic solvents and dyeing cotton deep black shades.

In testimony whereof I have hereunto set my hand.

JOSEF HALLER.